United States Patent
Skärin

(10) Patent No.: US 6,376,039 B1
(45) Date of Patent: Apr. 23, 2002

(54) SPLICEABLE ELASTIC LAMINATE HAVING RUBBER PROPERTIES

(75) Inventor: Jörgen Skärin, Värnamo (SE)

(73) Assignee: Trelleborg Building Systems AB (SE)

( * ) Notice: Subject to any disclaimer, the term of this patent is extended or adjusted under 35 U.S.C. 154(b) by 0 days.

(21) Appl. No.: 09/299,669

(22) Filed: Apr. 27, 1999

(30) Foreign Application Priority Data

May 26, 1998 (SE) .................................. 9801838

(51) Int. Cl.$^7$ ..................... B32B 3/00; B32B 27/08; B29C 47/00
(52) U.S. Cl. ..................... 428/57; 428/58; 428/517; 428/519; 156/243; 156/244.11; 156/244.24; 156/244.26
(58) Field of Search ............... 428/515, 57, 58, 428/517, 519; 156/244.11, 244.24, 244.26, 243

(56) References Cited

U.S. PATENT DOCUMENTS

| | | | |
|---|---|---|---|
| 3,962,018 A | 6/1976 | Costemalle et al. | 156/306 |
| 5,260,111 A | * 11/1993 | Valaitis et al. | 428/57 |
| 5,302,463 A | * 4/1994 | Murata et al. | 428/517 |
| 5,468,702 A | * 11/1995 | Jejelowo | 502/104 |
| 6,110,546 A | * 8/2000 | Honda et al. | 428/31 |

FOREIGN PATENT DOCUMENTS

EP 0376213 7/1990

OTHER PUBLICATIONS

WPI, Derwent Accession No. 95–078612, Yokohama Rubber Co. Ltd., "Connecting Sheet Materials for Building Roof or Industrial Waste—Using Thermoplastic Elastomer e.g. Ultrahigh Mol. Wt. Polyethylene High Density Polyethylene, Propylene Resin, EPDM Based Rubber etc. or Elastomer Comprising Butyl–Based Rubber, Styrene Based Thermoplastic Elastomer", JPA 7003962, 950106, DW9511 *Abstract*.

* cited by examiner

Primary Examiner—Paul Thibodeau
Assistant Examiner—Monique R Jackson
(74) Attorney, Agent, or Firm—Burns, Doane, Swecker & Mathis, L.L.P.

(57) ABSTRACT

A spliceable/joinable elastic laminate having rubber properties includes two mutually joined layers comprised of non-polar hydrocarbon compounds, of which one layer is a thermoplastic elastomer (TPE) and the other is a cross-linked vulcanized rubber of EPDM or butyl type. The laminate is characterized in that the thermoplastic elastomer contains at least 10% by weight of an elastic copolymer that can be mixed with filler and a flame resistant agent to a mixture that contains at least 50% filler. The elastic copolymer contains suitable ethylene and octene in a ratio from 1:10 to 4:10. The thermoplastic elastomer may have any composition that will impart a viscosity within the range of 0.01–1 NM in the temperature range of 70–150° C.

17 Claims, No Drawings

SPLICEABLE ELASTIC LAMINATE HAVING RUBBER PROPERTIES

The present invention relates to a spliceable elastic laminate having rubber properties and comprising two mutually joined layers that consist of non-polar hydrocarbon compounds, of which one layer is a thermoplastic elastomer (TPE) and the other is a cross-linked vulcanized rubber of the EPDM type or the butyl type. The laminate is primarily intended for use as a sealing sheet or membrane in different types of building construction work, although it may also find use in other areas in which the possibility to splice or join rubber is highly desirable. Rubber suits, such as diving suits and protective suits are examples of this latter field of use.

By "rubber properties" is meant in the present context the unique properties associated with the fact that rubber is a cross-linked material which is able to take-up significant movements under the most varying climatic conditions without rupturing or being permanently deformed when subjected to moderate loads.

Hitherto, it has only been possible to join together two sheets of rubber with an homogenous splice that has rubber properties by vulcanizing said sheets together. Vulcanization of the sheets is effected by placing a splicing strip of non-vulcanized rubber between mutually overlapping rubber sheets and then applying pressure and heat to the splice over a given period of time. The length of time required to complete the process has greatly limited the use of rubber-based sheets in those applications where splicing is necessary, for economic reasons.

Other splicing methods have also been tried, such as gluing or like methods. These methods, however, also have serious limitations with respect to productivity and durability. They are also detrimental from an environmental aspect, because of the need to use undesirable solvents.

In the case of building or construction applications, such as the use of waterproof membranes as roof coverings or in the construction of tunnels, bridges, dams, swimming pools, and other similar applications, the difficulties experienced in splicing together rubber sheets has often resulted in the preference to use non-elastic sealing products or waterproofing membranes that are based on bitumen or thermoplastic materials which can readily be spliced by fusing together material surfaces in a splice overlap, e.g. by heating said surfaces with hot air or in some other appropriate manner and then applying pressure to said surfaces as the materials cool.

Several methods of avoiding the aforedescribed problems associated with the use of rubber where splicing is required have been suggested.

JP-A-60 203640 teaches a method of avoiding problems when splicing rubber in the production of a waterproof sheet, simply by positioning a layer of rubber and a thermoplastic elastomer with the surfaces to be joined together overlapping one another and thereafter heating the sheets to a temperature of 400–600° C. by means of a hot-air gun. The thus heated sheets are then pressed together with the aid of a pressure roller at 5–10 kg/cm to form said splice or join. It will be understood that the application of this method is limited by the high material costs and working costs involved.

EP-A1-0 528 296 describes a rubber splice or join and a method of splicing an intermediate sheet of thermoplastic polyolefin film between the overlapping surfaces of rubber sheets. The join, or splice, is effected by heating the overlapping surfaces to a temperature slightly above the melting point of the thermoplastic film. This method is said to produce a join with higher productivity and greater strength than a glued join between rubber sheets. However, the elastic properties of the join are reduced in comparison with the join obtained by vulcanization with an intermediate rubber sheet as described above. This also presents a complication in comparison with the use of fusible thermoplastic sealing material, as before mentioned.

U.S. Pat. No. 3,962,018 teaches a method of producing multi-layer composites from plastic and rubber, wherewith one layer comprises a mixture of thermoplastic polyolefin and 10–40% by weight elastomer fused together at a temperature higher than 150° C. The mixture is applied to an elastomeric surface (EPDM or butyl rubber) that has been heated to 150° C., whereafter the layers are joined together by heating said layers to about 150–250° C. and pressing said layers with a pressure of between 1 and 10 kg/cm$^2$. This method enables the covering materials to be placed and joined together to form a multi-layer composition in a continuous process. The covering material, however, consists mainly of a thermoplastic material, which does not have the elastic properties required for coacting with the rubber and therewith provide a finished product that has rubber properties.

EP-A1-0 693 367 teaches a laminate that is produced by joining a polymer film to vulcanized EPDM rubber, or by extruding said film and rubber together and then vulcanizing the product obtained. In this particular case the polymer film is based on polyamide and/or polyethylene, copolymers of ethylene, polypropylene, or copolymers of propylene. Since manufacture, including shaping of said layers, placing said layers together and joining together said layers, is effected in a continuous process, the laminate product is attractive from the aspect of cost but is still insufficiently elastic to be measured against rubber with respect to splicing or joining the product.

The inventive laminate is intended to provide a material that has rubber properties and that is not encumbered with the aforesaid problems regarding spliceability that are otherwise associated with rubber material or with insufficiently elastic joins and splices that are associated with hitherto known rubber/polymer laminates. The laminate can thus be used advantageously as a sealing membrane for roof coverings and similar building applications where simple and quick splicing/joining is a pronounced desideratum.

Accordingly, there is provided in accordance with the invention a spliceable elastic laminate that has the features set forth in the accompanying product claim, and a method of producing such a laminate in accordance with the method steps set forth in the method claims.

As mentioned in the introduction, the inventive laminate is comprised of two mutually joined layers built-up of non-polar hydrocarbon compounds, of which one sheet or layer is comprised of a thermoplastic elastomer (TPE) and the other is comprised of cross-linked vulcanized EPDM rubber or butyl rubber. The laminate is characterized in that the thermoplastic elastomer includes at least 10% by weight of an elastic copolymer that can be mixed with filler and fire retarding agent to a mixture containing at least 50% by weight filler.

A thermoplastic elastomer (TPE) is an elastomer, i.e. a polymeric material, of high elastic stretchability in which the cohesive forces necessary for the elastic deformation of the material are of a physical nature and which can be nullified by heating or melting the material, as distinct from rubber, whereby the material becomes plastically formable at elevated temperatures and returns to its highly elastic state when cooled.

The elastic copolymer used will conveniently be one that contains ethylene and octene in the ratios of from 1:10 to 4:10, preferably ratios from 2:10 to 3:10. The copolymer may also conveniently contain petroleum resin in an amount corresponding to 1–20% by weight, which provides good adhesiveness and adapts viscosity and elasticity.

The thermoplastic elastomer will also suitably contain a filler in an amount corresponding to 20–80% by weight, preferably 40–60% by weight. The filler may suitably be calcium carbonate, carbon black or silicate. The aforesaid flame resistant agent may be aluminium hydrate or magnesium hydrate.

The composition of the thermoplastic elastomer may conveniently be such as to impart to the elastomer a viscosity of within 0.01–1 Nm, preferably 0.05–0.6 Nm within a temperature range of 70–150° C. The viscosity of this layer can herewith be optimized to obtain good adhesion (wetting) to the EPDM-layer when heat welding said layers together, and to avoid the laminates sticking together when vulcanizing or handling said laminates and when storing said laminates in roll form.

Both of the layers in the laminate may conveniently include peroxides in an amount corresponding to less than 1% by weight, with the intention of improving cross-linking through the medium of carbon-to-carbon bonds with the thermoplastic elastic layer.

The thermoelastic layer in the laminate will normally have a thickness smaller than 0.5 mm, while the thickness of the rubber layer will be greater than 0.5 mm. A suitable thickness range with respect to the thermoelastic layer is 0.2–0.4 mm, and from 0.7–0.9 mm with respect to the rubber layer. If considered appropriate, a filament reinforcement may be included in the rubber layer and/or in the thermoelastic layer. The thermoelastic layer may incorporate predetermined colors for given purposes significant to the design of roofs and roof systems and also to improve thermal reflection.

When covering a roof or when using the laminate in similar applications, the thermoelastic layer will face towards the underlying supportive surface and overlap the adjacent part of the laminate that faces away from said surface, i.e. the rubber layer, in the join locations.

The inventive laminate is produced by calendering or extruding non-vulcanized EPDM rubber or butyl rubber and thermoplastic elastomeric (TPE) foil or film containing at least 10% by weight elastic copolymer to form a continuous foil web. The web is then rolled-up on a drum and thereafter vulcanized, for example in an autoclave. Although the thermoplastic elastic and the rubber will stick together in this case and the rubber be cross-linked and therewith unmeltable in the present terms, the thermoplastic elastic layer will retain its thermoplastic properties and form a meltable layer. By "calendering" is meant processing in a machine that includes two or more rolls equipped with devices for heating and cooling at adjustable distances therebetween. By "extrusion" is meant here so-called broad-slot extrusion in which the input components are extruded through a flat nozzle that has a broad orifice, i.e. an orifice of small height in relation to width.

A suitable type of rubber for use with the invention is an ethylene propylene rubber (EPDM) based on terpolymers of ethylene, propylene and a diene, whose remaining unsaturated part enters into the side position of the main chain.

The invention will now be described in more detail with reference to practical examples and also with further discussion concerning the technical and practical advantages afforded by the invention.

The invention is thus based on an elastic copolymer. The latest developments in the field of metallocene catalysts have made it possible to produce thermoplastics that have thermoplastic elastic properties very close to the properties of rubber. The thermoplastic elastic layer of the inventive laminate is thus based on an elastic copolymer that can be modified so as to enable it to be laminated to rubber fabric, butyl rubber or EPDM rubber in a conventional calendering process or extrusion process in a cost effective manner;

vulcanized so as to enhance adhesion between the layers without said layers losing their rubber properties and thermoplastic elastic properties respectively;

spliced or joined by applying heat to an overlapping join region, wherewith the thermoplastic elastic layer melts and adheres to the rubber layer so as to obtain a tight and impervious join/splice having elastic properties, when the join is compressed and cooled; and enables the join/splice to be achieved with the aid of welding apparatus generally available in the field.

Thus, the invention enables the manufacture of sealing sheets and membranes that have rubber properties and that can be joined or spliced together under practical working conditions in the same way as earlier known bitumen and thermoplastic based water-proof membranes, which is a highly significant technical advantage and, in the present context, a presupposition which it has not earlier been possible to achieve with rubber-based sealing sheets or membranes. Distinct from sealing sheets or water-proof membranes that are based on bitumen and thermoplastic material, however, the inventive laminate will provide a join or splice that has rubber-elastic properties in all directions and which can also be melted by applying heat through said rubber sheet without harming the laminate, such that the thermoplastic elastic layer will soften to a state in which it loses its mechanical strength and therewith enables the join/splice to be opened. The joins/splices can be welded in accordance with methods earlier known with respect to thermoplastic sealing sheets or membranes, by heating said sheets to welding temperature with the aid of hot air or heating wedge and then cooling the join under pressure.

The mechanical strength and elasticity of the join/splice will have the same order of magnitude as that of a conventional vulcanized join. Tensile tests were carried out on a 25 mm strip that included joins/splices, at a strip tensioning speed of 100 mm/min. The results obtained are set forth in the following table.

TABLE

| Type of join/splice | Mechanical strength (N/mm$^2$) | Ultimate elongation (%) |
|---|---|---|
| Hot-air welded joins of elastic laminates | 8.2 | 450 |
| Vulcanized joins | 10.4 | 425 |

Compared with the rubber component and the TPE component of the laminate, the laminate had a mechanical strength of the same order of magnitude up to an elongation of about of about 150% and with further elongation a mechanical strength which was closer to the rubber component than to the TPE component.

Practical trials carried out on test roofs with an inventive laminate showed that the application time could be reduced by about 30% in relation to hitherto known and available materials and methods, and that other necessary auxiliaries associated with roof laying could be reduced to 2 in number as opposed to 5 in number in the case of known methods.

Sealing sheets or membranes comprised of an inventive laminate need not be secured in place with the aid of penetrating fasteners, but can be welded to strips or plates that have been secured mechanically to the underlying surface. The elastic laminate is then applied with the thermoplastic elastic layer facing towards said strip or plate. Heat is then applied to the exposed rubber surface by means of contact heat, radiation heat or hot air, said heat passing down through the rubber layer and melting the thermoplastic elastic layer. Attachment is then effected, by applying pressure to the attachment surface, e.g. with a press pad or a press wheel, as the material cools.

The inventive laminate is unique and affords advantages in several respects, of which the following are mentioned by way of example.

The laminate enables the use of a jointing/splicing system with which only hot air need be used to splice the laminate, which can thus be effected with the use of conventional hot air pistols.

Splicing/jointing can be effected by heating the rubber layer such that heat will pass through the rubber to the thermoplastic elastic layer until the correct welding temperature is reached, whereafter the join/splice is subjected to pressure and cooled.

The entire laminate surface can be joined to another surface, wherewith all transits or lead-throughs on the roof can be readily provided without the need of special products to this end.

The laminate or sealing sheet or membrane can be welded to attachment devices in the form of strips or plates, thereby enabling non-perforated attachment of said sheet to different kinds of underlying support surfaces.

The joins/splices can be opened so as to enable sealing sheets or membranes to be removed, by heating the rubber sheet to a temperature at which heat will pass through the rubber and down to the thermoplastic elastic layer, until said layer softens to a state in which it looses its mechanical strength.

The substrate can be given different colors.

The laminate can be reinforced by, e.g. including glass fiber fabric or polyester fabric between said layers, or by laminating fiber felt to the thermoplastic elastic layer.

The laminate is thermally stable, meaning that the laminate as a whole cannot melt or be melted, as distinct from PVC products or bitumen products.

The laminate is elastic in all directions and can be stretched by some hundred percent while retaining said rubber properties.

What is claimed is:

1. A spliceable/joinable elastic laminate having rubber properties and including two mutually joined layers that comprise non-polar hydrocarbon compounds, of which a first layer comprises a thermoplastic elastomer and a second layer comprises a cross-linked vulcanized ethylene-propylene-diene terpolymer rubber or a cross-linked vulcanized butyl rubber wherein the first layer includes at least 10% by weight of an elastic copolymer that is a product of metallocene-catalyzed polymerization and contains ethylene and octene in a weight ratio form 1:10 to 4:10.

2. The spliceable/joinable elastic laminate according to claim 1, wherein the elastic copolymer contains ethylene and octene in a weight ratio from 2:10 to 3:10.

3. The spliceable/joinable elastic laminate according to claim 2, wherein the first layer contains petroleum resin in an amount corresponding to 1–20% by weight.

4. The spliceable/joinable elastic laminate according to claim 3, wherein the first layer contains filler selected from the group consisting of calcium carbonate, carbon black, and silicate, in an amount corresponding to 20–80% by weight.

5. The spliceable/joinable elastic laminate according to claim 4, wherein the thermoplastic elastomer has a composition which imparts thereto a viscosity within the range of 0.01–1 Nm within a temperature range of 70–150° C.

6. The spliceable/joinable elastic laminate according to claim 4, wherein the first layer contains petroleum resin in an amount corresponding to 8–12% by weight.

7. The spliceable/joinable elastic laminate according to claim 3, wherein the first layer contains filler selected from the group consisting of calcium carbonate, carbon black, and silicate, in an amount corresponding to 40–60% by weight.

8. The spliceable/joinable elastic laminate according to claim 4, wherein the thermoplastic elastomer has a composition which imparts thereto a viscosity within the range of 0.05–0.6 Nm within a temperature range of 70–150° C.

9. The spliceable/joinable elastic laminate according to claim 1, wherein the first layer contains petroleum resin in an amount corresponding to 1–20% by weight.

10. The spliceable/joinable elastic laminate according to claim 1, wherein the first layer contains petroleum resin in an amount corresponding to 8–12% by weight.

11. The spliceable/joinable elastic laminate according to claim 1, wherein the first layer contains filler selected from the group consisting of calcium carbonate, carbon black, and silicate, in an amount corresponding to 20–80% by weight.

12. The spliceable/joinable elastic laminate according to claim 1, wherein the first layer contains filler selected from the group consisting of calcium carbonate, carbon black, and silicate, in an amount corresponding to 40–60% by weight.

13. The spliceable/joinable elastic laminate according to claim 1, wherein the thermoplastic elastomer has a composition which imparts thereto a viscosity within the range of 0.01–1 Nm within a temperature range of 70–150° C.

14. The spliceable/joinable elastic laminate according to claim 1, wherein the thermoplastic elastomer has a composition which imparts thereto a viscosity within the range of 0.05–0.6 Nm within a temperature range of 70–150° C.

15. A sealing sheet or waterproof membrane in a roof covering system comprising the spliceable/joinable elastic laminate of claim 1.

16. A sealing sheet or waterproof membrane in a bridge, tunnel, pool or basin comprising the spliceable/joinable elastic laminate of claim 1.

17. A method of producing a spliceable/joinable laminate having rubber properties and including two mutually joined layers that comprise non-polar hydrocarbon compounds, of which a first layer comprises a thermoplastic elastomer and a second layer comprises a cross-linked vulcanized ethylene-propylene-diene terpolymer rubber or a cross-linked vulcanized butyl rubber wherein the first layer includes at least 10% by weight of an elastic copolymer that is a product of metallocene-catalyzed polymerization and contains ethylene and octene in a weight ratio from 1:10 to 4:10, and said method comprising calendering or extruding simultaneously a non-vulcanized ethylene-propylene-diene terpolymer rubber or non-vulcanized butyl rubber and a foil or film of thermoelastic material that contains at least 10% by weight of said elastic copolymer so as to form a continuous foil web, rolling the web onto a drum and then vulcanizing said web, whereby adhesion takes place between the thermoelastic material and rubber in the web and the rubber is crosslinked and becomes unmeltable, whereas the thermoelastic layer retains its thermoelastic properties and forms a meltable layer.

* * * * *